United States Patent
Faulkner et al.

(10) Patent No.: US 6,279,421 B1
(45) Date of Patent: Aug. 28, 2001

(54) CONNECTING ROD ASSEMBLY WITH REDUCED LENGTH VARIABILITY

(75) Inventors: Edward Faulkner; George Morgan, both of St. Joseph, MI (US)

(73) Assignee: Gast Manufacturing, Inc., Benton Harbor, MI (US)

( * ) Notice: Subject to any disclaimer, the term of this patent is extended or adjusted under 35 U.S.C. 154(b) by 0 days.

(21) Appl. No.: 09/383,504

(22) Filed: Aug. 26, 1999

(51) Int. Cl.$^7$ ....................................... F16J 15/32
(52) U.S. Cl. ..................... 74/579 R; 92/240; 92/191; 92/109
(58) Field of Search ................... 74/579 R, 580, 74/588, 593; 92/98 R, 99, 109, 172, 191, 209, 240, 248

(56) References Cited

U.S. PATENT DOCUMENTS

| | | | |
|---|---|---|---|
| 4,924,759 | * 5/1990 | Plummer | 92/240 |
| 4,993,925 | * 2/1991 | Becker et al. | 92/99 X |
| 5,064,359 | * 11/1991 | Plummer | 92/240 X |
| 5,092,224 | 3/1992 | Rozek . | |
| 5,213,025 | 5/1993 | Rozek . | |
| 5,231,917 | * 8/1993 | Wood | 92/240 X |
| 5,937,736 | * 8/1999 | Charpie | 92/240 |

* cited by examiner

*Primary Examiner*—Mary Ann Green
(74) *Attorney, Agent, or Firm*—Barnes & Thornburg

(57) ABSTRACT

A connecting rod assembly for rocking piston compressors, diaphragm compressors and vacuum pumps is provided where the overall height of the connecting rod assembly is dependent only upon the overall height of the connecting rod structure and is not dependent upon the thickness of the diaphragm or the thickness of the retainer plate. The connecting rod includes a disk portion for supporting an annular diaphragm in the case of a diaphragm pump or a cup in the case of a rocking piston compressor or a vacuum pump. The connecting rod also includes a distal end section that extends upward through the annular diaphragm and through an annular retainer plate. The diaphragm or cup is sandwiched between the annular retainer plate and the disk portion of the connecting rod. The overall height of the assembly is determined by the distance between the end face of the disk portion of the connecting rod and the crank end of the connecting rod. The annular retainer plate bottoms out on the disk portion of the connecting rod and therefore does not contribute any height variability to the assembly. Because the diaphragm or cup is trapped below the annular retainer plate, the diaphragm does not contribute any height variability to the assembly as well.

10 Claims, 3 Drawing Sheets

CONNECTING ROD ASSEMBLY WITH REDUCED LENGTH VARIABILITY

FIELD OF THE INVENTION

The present invention relates generally to rocking piston and diaphragm compressors as well as vacuum pumps. More specifically, the present invention relates to an improved connecting rod assembly for use in rocking piston compressors, diaphragm compressors and vacuum pumps that has reduced length variations thereby providing a more consistent compression ratio and reduced variations in compressor or pump performance.

BACKGROUND OF THE INVENTION

Rocking piston compressors, diaphragm compressors and vacuum pumps all use the reciprocating motion of a connecting rod to produce increased pressures within a control volume, such as a cylinder. The amount of stroke of the connecting rod determines the compression ratio for the fixed control volume. Therefore, variations in the length of the connecting rod assembly translate to variations in the compression ratio and ultimately variations in compression or vacuum pump performance. These performance variations may include changes in flow, amperage draw, maximum pressure output or vacuum levels.

A typical design for a connecting rod assembly includes a connecting rod, a diaphragm or cup and a retainer to hold the diaphragm or cup on the connecting rod. An example of a typical currently-available connecting rod assembly for a diaphragm compressor is illustrated in FIGS. 1–3A. A connecting rod assembly for a rocking compressor or a vacuum pump is shown in FIG. 3B. Specifically, a connecting rod assembly is shown at 10a which includes a connecting rod 11a, a diaphragm 12a and a retainer plate 13a. The retainer plate 13a sandwiches the diaphragm 12a between the retainer plate 13a and a disk portion 14a of the connecting rod 11a. Because the connecting rod assembly 10a must be serviceable with common hand tools, threaded fasteners, such as screws 15a are used to secure the retainer plate 13a to the disk portion 14a of the connecting rod 11a. The connecting rod 11a includes a crank end 16a that is connected to the disk portion 14a by way of a middle section 17a.

The problem associated with the diaphragm rod assembly 10a is best illustrated in FIGS. 3A and 3B. Specifically, the overall length of the assembly 10a is dependent upon three separate parts: the overall length or height of the connecting rod 11a, the thickness of the diaphragm 12a (see FIG. 3A) or cup seal 12b (see FIG. 3B) as well as the thickness of the retainer 13a or 13b. As a result, a rod assembly having an intended length or height of 5⅛" may have a height variability range exceed 0.02". The specific variability range for the assemblies 10a and 10b illustrated in FIGS. 1–3B is 0.023". This variability range is significant in that it is found that in excess of 50% of the possible variability of the compression ratio is caused by the height variability of the rod assembly.

Yet another factor that compounds this problem is that the diaphragm 12a or cup seal 12 must be serviceable using common hand tools readily available to the unskilled equipment operator. Further, serviceability is important in that the retainer plate and diaphragm must be easily removed for replacement of the diaphragm. One problem associated with currently-available connection rod assemblies is that the overall height or length of the assembly changes when the diaphragm is changed. Specifically, referring back to FIGS. 1–3B and, specifically to FIGS. 3A and 3B, it will be noted that the thickness of the diaphragm 12a or cup seal 12b can affect the overall height of the assembly if the diaphragm 12a or cup seal 12b prevents the retainer 13a, 13b from engaging the disk portion 14a, 14b of the connecting rod 11a, 11b.

Therefore, there is a need for an improved connecting rod assembly wherein the assembled height variability is reduced as much as possible. Further, there is a need for an improved connecting rod assembly which is quickly and easily serviced and wherein the changing of the diaphragm or cup seal does not affect the overall height of the assembly. Still further, there is a need for an improved connecting rod assembly that can serve as al replacement for existing connecting rod assemblies and existing rocking piston compressors, diaphragm compressors and vacuum pumps.

SUMMARY OF THE INVENTION

The present invention satisfies the aforenoted need by providing a connecting rod assembly that comprises a connecting rod comprising a crank end connected to a diaphragm or cup end with a middle section disposed therebetween. The diaphragm end comprises a disk portion for supporting an annular diaphragm or cup seal. The disk portion is disposed between the middle section and a distal end section. The diaphragm or cup seal is sandwiched between the disk portion of the connecting rod and an annular retainer. The distal end section of the connecting rod extends through both the annular diaphragm and the annular retainer.

In an embodiment, the distal end section of the connecting rod has an outer face and the crank end of the connecting rod has a lowermost point. The assembly therefore has an overall length defined by a distance between the lowermost point of the crank end of the connecting rod and the outer face of the distal end section of the connecting rod.

In an embodiment, the retainer is attached to the disk portion with at least one threaded fastener.

In an embodiment, the retainer is attached to the disk portion with at least one screw.

In an embodiment, the retainer comprises a lower annular section that engages the disk portion of the diaphragm or cup end of the connecting rod and an upper annular section that extends radially outwardly beyond the lower annular section. As a result, an annular recess is provided underneath the upper annular section for accommodating an inner portion of the annular diaphragm and sandwiching the inner portion of the annular diaphragm between the upper annular section of the retainer and the disk portion of the diaphragm or cup end of the connecting rod.

In an embodiment, the retainer is attached to the disk portion with at least one screw that extends through the lower annular portion of the retainer.

In an embodiment, the present invention provides a method for reducing variations in a compression ratio of a compressor or a vacuum pump. The method comprises the steps of providing a connecting rod assembly as described above for purposes of replacing an existing connecting rod assembly with an overall height that is dependent upon the height of the connecting rod as well as the thicknesses of the retainer and/or the diaphragm.

It is therefore an advantage of the present invention to provide an improved connecting rod assembly with reduced height variability.

Yet another advantage of the present invention is that to provide an improved connecting rod assembly that may be conveniently used as a substitute for existing prior art connecting rod assemblies.

Yet another advantage of the present invention is that it provides an improved connecting rod assembly whose overall height is dependent only upon the height or length of the connecting rod and not dependent upon the thicknesses of either the retainer or the diaphragm.

Still another advantage of the present invention is that it provides an improved means for reducing the variations in the compression ratio of a compressor or a vacuum pump.

Another advantage of the present invention is that it provides a means for reducing the variations in flowrate, amperage draw, maximum pressure or vacuum levels in compressors and vacuum pumps.

Other objects and advantages of the present invention will become apparent upon reading the following detailed description and appended claims, and upon reference to the accompanying drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 7:
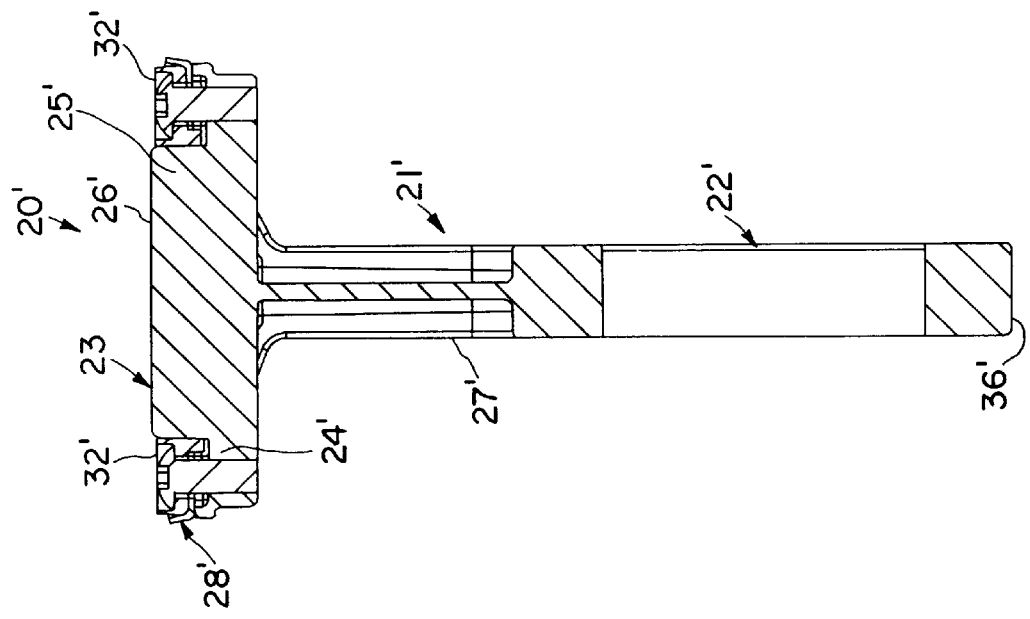
FIG. 7 is a side sectional view of a connecting rod assembly for a rocking piston compressor or vacuum pump made in accordance with the present invention.
Figure 6:
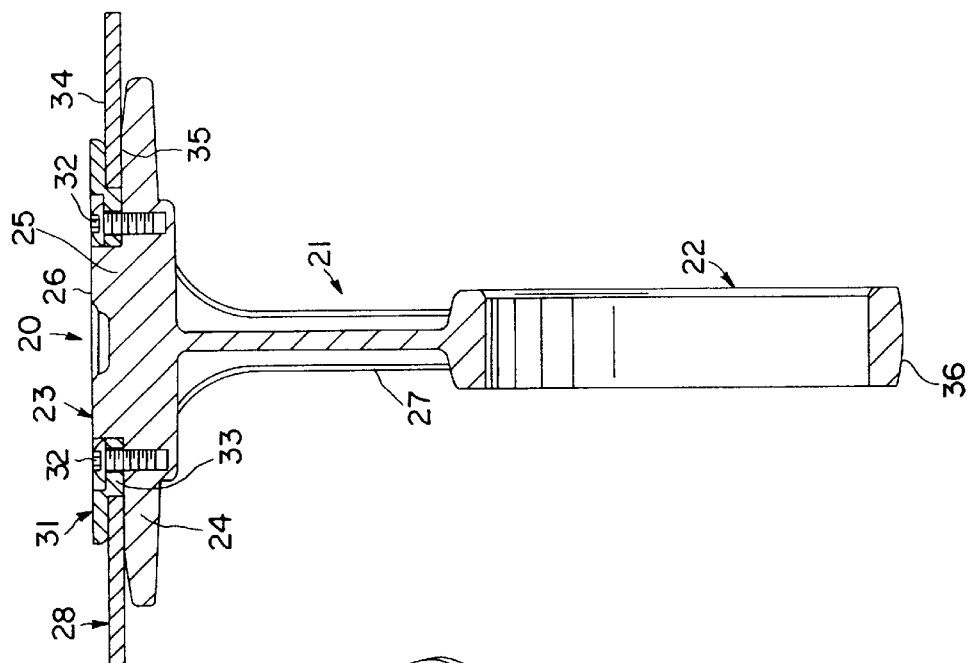
FIG. 6 is a side sectional view of the connecting rod assembly shown in FIG. 4.
Figure 5:
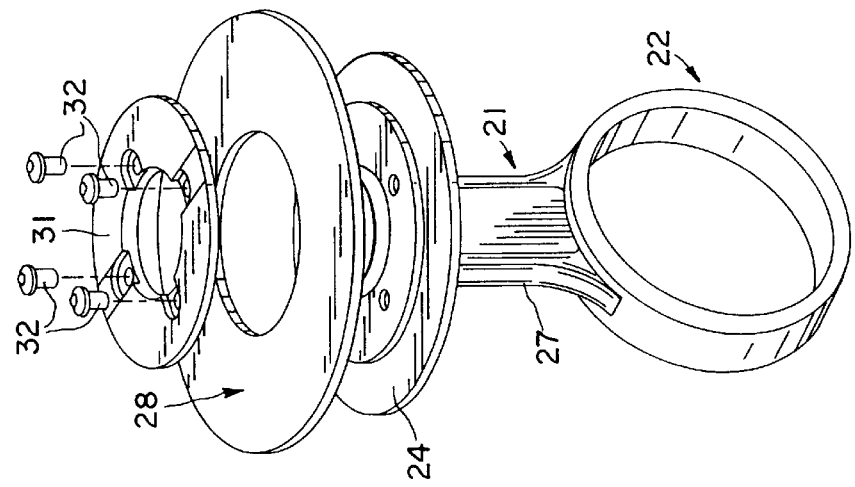
FIG. 5 is a perspective exploded view of the connecting rod assembly shown in FIG. 4.
Figure 4:
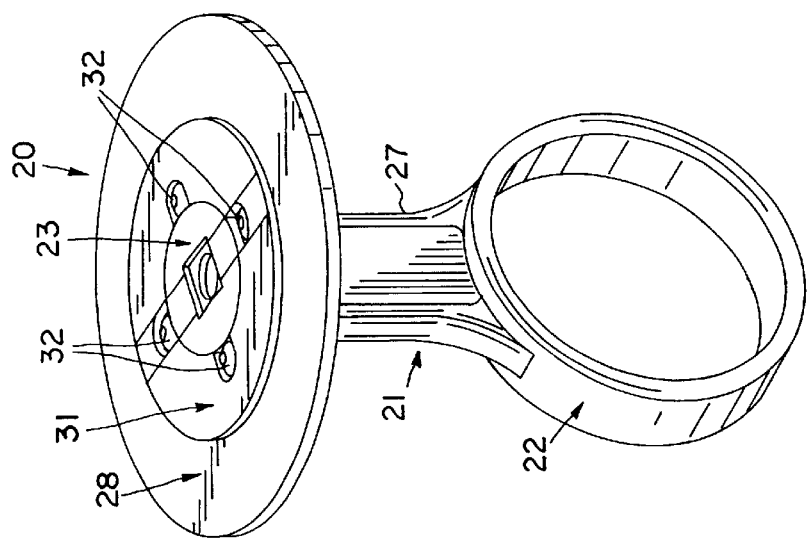
FIG. 4 is a perspective view of a connecting rod assembly made in accordance with the present invention.

An improved connecting rod assembly 20 for a diaphragm compressor is illustrated in FIGS. 4–6 and an improved connecting rod assembly 20' for a rocking piston compressor or a vacuum pump is shown in FIG. 7. Referring first to FIGS. 4–6, the assembly 20 includes a connecting rod 21 having a crank end 22 and a diaphragm end 23 that includes a disk portion 24 and a distal end section 25. The distal end section 25 is substantially cylindrical in configuration and includes an outer face 26 (see FIG. 6). The diaphragm end 23 is connected to the crank end 22 by way of a middle section 27.

A diaphragm 28 is sandwiched between the disk portion 24 and an annular retainer plate 31. The annular retainer plate 31 is connected to the disk portion 24 by way of conventional threaded fasteners 32. More specifically, the annular retainer 31 includes a lower annular section 33 through which the fasteners 32 extend and an upper annular portion 34 which extends radially outwardly beyond the lower annular section 33. As a result, a recess is provided in the annular retainer 31 for accommodating the inner portion 35 of the diaphragm 28 as shown in FIG. 6.

Figure 3A:
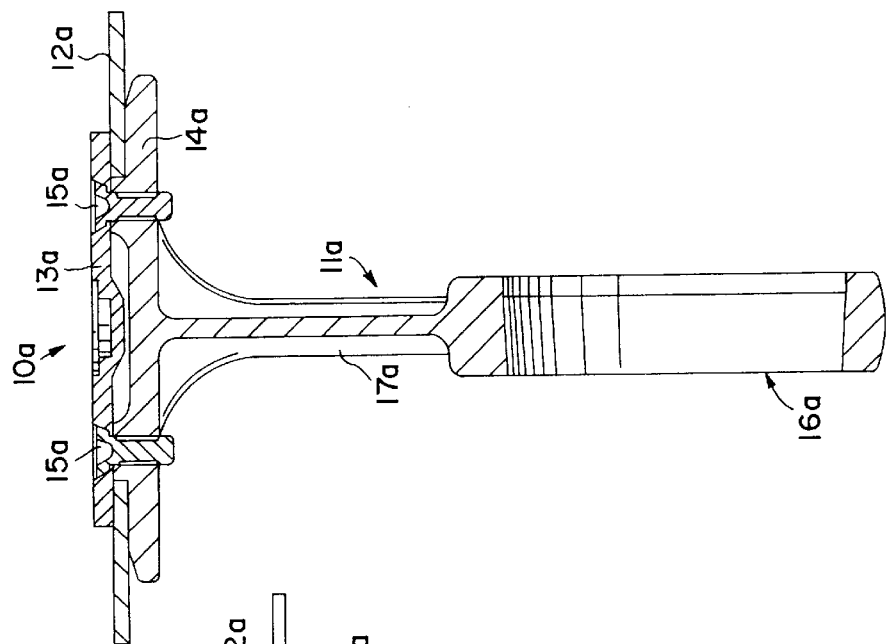
FIG. 3A is a side sectional view of the connecting rod assembly shown in FIG. 1.
Figure 2:
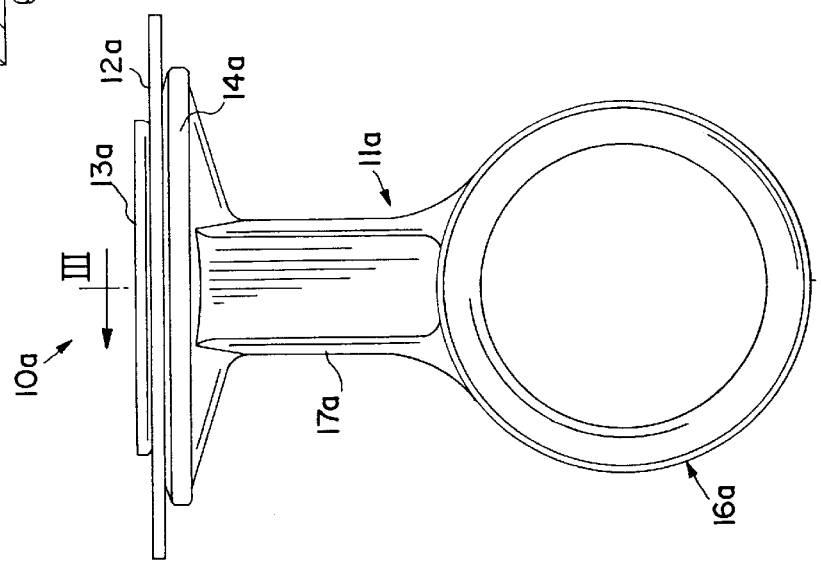
FIG. 2 is a plan view of the connecting rod assembly shown in FIG. 1.
Figure 1:
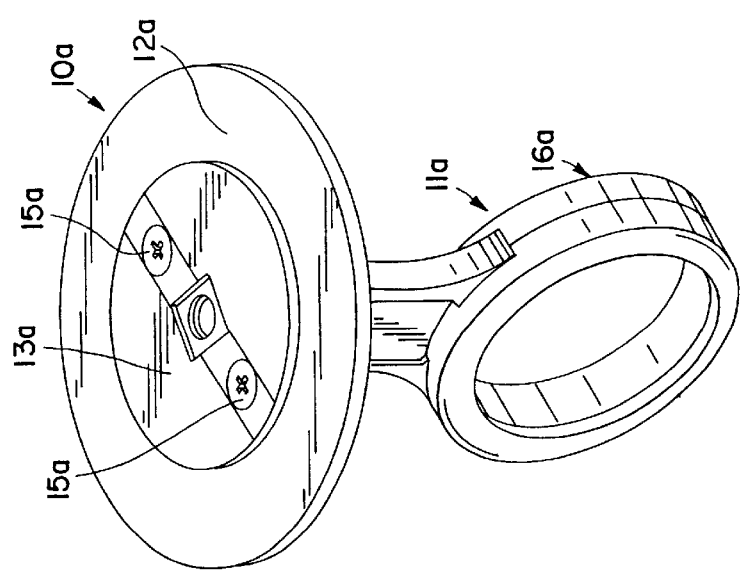
FIG. 1 is a perspective view of a prior art connecting rod assembly of the diaphragm pump.
Figure 3B:
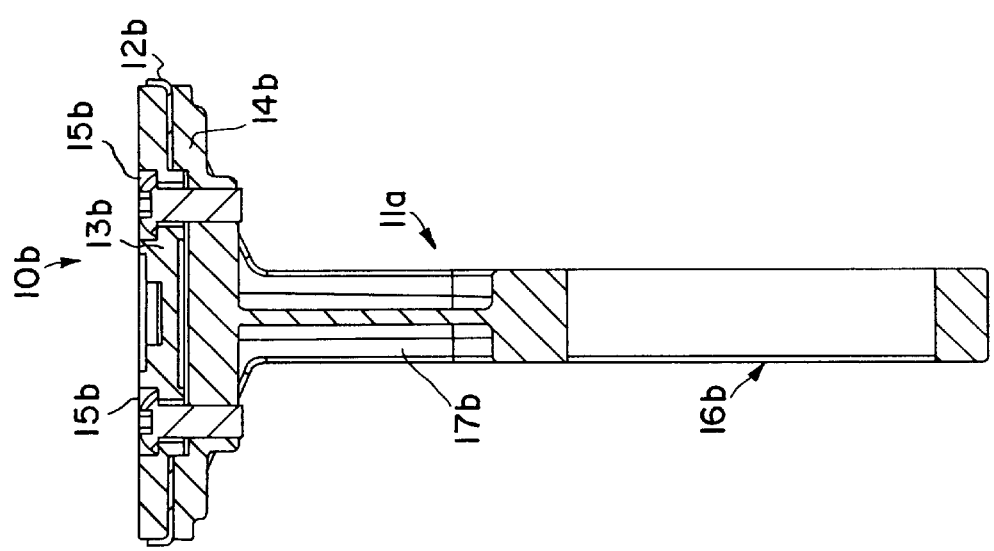
FIG. 3B is a side sectional view of the rocking piston connecting the rod assembly prior art.

It will also be noted from FIG. 6, that the overall height of the assembly 20 is determined by the overall height of the connecting rod 21, or the distance between the outer face 26 of the diaphragm section 25 and the lowermost point 36 of the crank end 22 of the connecting rod 21. By having the overall height of the assembly 20 dependent upon only one part, i.e. the connecting rod 21, the overall height variability of the assembly 20 is reduced in comparison to the assemblies of the prior art, e.g., the assembly 10 shown in FIGS. 1–3. In comparing the assembly 20 shown in FIGS. 4–6 with the assembly 10 shown in FIGS. 1–3, the inventors have found that the assembly 20 provides an overall reduction in compression ratio variability of 40% as compared to the assembly 10. Again, no additional height variability will be introduced by replacement of the diaphragm 28 because the lower annular section 33 of the annular retainer 31 will always bottom out on the disk portion of the connecting rod 21. Thus, the overall height of the assembly 20 is dependent only upon the overall height of the connecting rod 21.

Referring to FIG. 7, the assembly 20' similarly includes an annular retainer 31' for sandwiching the cup seal 28' between the disk portion 24' of the cup seal end 23' and the retainer 31'. The assembly 20' is intended for use in rocking piston compressors and vacuum pumps.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed:

1. A connecting rod assembly comprising:
   a unitary connecting rod comprising a crank end connected to a diaphragm end with a middle section disposed therebetween,
   the diaphragm end comprising a disk portion for supporting an annular seal member and a distal end section, the disk portion being disposed between the middle section and the distal end section,
   the seal member being sandwiched between the disk portion of the connecting rod and an annular retainer,
   the distal end section of the annular seal member of the connecting rod extending through both the annular seal member and the annular retainer, the annular retainer being removably connected to the disk portion; and
   the retainer is attached to the disk portion with at least one fastener.

2. The connecting rod assembly of claim 1 wherein the distal end section of the connecting rod has an outer face and the crank end of the connecting rod has a lowermost point, the assembly has an overall length defined by a distance between the lowermost point of the crank end of the connecting rod and the outer face of the distal end section or the connecting rod.

3. The connecting rod assembly of claim 1 wherein the assembly has an overall length and the connecting rod has an overall length, the overall length of the assembly being equal to the overall length of the connecting rod.

4. The connecting rod assembly of claim 1 wherein the annular seal member is selected from the group consisting of a diaphragm and a cup seal.

5. The connecting rod assembly of claim 1 wherein the at least one fastener is an at least one screw and the annular retainer is attached to the disk portion with the at least one screw.

6. The connecting rod assembly of claim 1 wherein the annular refer comprises a lower annular section that engages the disk portion of the annular seal member of the connecting rod and an upper annular section that extends radially outwardly beyond the lower annular section thereby providing an annular recess for accommodating at least an inner portion of the annular seal member and sandwiching said inner portion of the seal member between said upper annular section of the annular retainer and the disk portion of the diaphragm end of the connecting rod.

7. The connecting rod assembly of claim 6 wherein the at least one fastener is an at least one screw and the annular retainer is attached to the disk portion with the at least one screw that extends through the lower annular section of the annular retainer.

8. A connecting rod assembly comprising:

a unitary connecting rod comprising a crank end connected to a seal member end with a middle section disposed therebetween, the seal member end comprising a disk portion for supporting an annular seal member and a distal end section, the disk portion being disposed between the middle section and the distal end section, the annular seal member being sandwiched between the disk portion of the connecting rod and an annular retainer, the annular retainer being attached to the disk portion with at least one threaded fastener, the distal end section of the connecting rod extending through both the annular seal member and the annular retainer, wherein the distal end section of the connecting rod having an outer face and the crank end of the connecting rod having a lowermost point, the assembly having an overall length defined by a distance between the lowermost point of the crank end of the connecting rod and the outer face of the distal end section of the connecting rod.

9. The connecting rod assembly of claim 8, wherein the annular retainer comprises a lower annular section that engages the disk portion of the seal member end of the connecting rod and an upper annular section that extends radially outwardly beyond the lower annular section thereby providing an annular recess for accommodating at least an inner portion of the annular seal member and sandwiching said inner portion of the annular seal member between said upper annular section of the annular retainer and the disk portion of the connecting rod, the threaded fastener extending through the lower annular section of the retainer.

10. The connecting rod assembly of claim 8 wherein the seal member is selected form the group consisting of a diaphragm and a cup seal.

* * * * *